United States Patent [19]

Jurschak

[11] 3,959,605

[45] May 25, 1976

[54] CIRCUIT FOR DETECTING LOSS OF TELEPHONE LINE VOLTAGE

[76] Inventor: John J. Jurschak, 825 Casazza Drive, Reno, Nev. 89502

[22] Filed: Sept. 11, 1974

[21] Appl. No.: 505,162

[52] U.S. Cl. ..................... 179/175.3 R; 340/248 B; 324/133
[51] Int. Cl.² ........................................... H04B 3/46
[58] Field of Search ..................... 179/175.3 R, 175; 340/248 B; 324/133, 72

[56] References Cited
UNITED STATES PATENTS

| | | | |
|---|---|---|---|
| 3,437,928 | 4/1969 | Baker et al. ......................... | 324/133 |
| 3,573,780 | 4/1971 | Butterbaugh ..................... | 340/248 B |
| 3,729,597 | 4/1973 | Garrett et al. ....................... | 179/175 |

*Primary Examiner*—Douglas W. Olms

[57] ABSTRACT

The present invention deals with a new and useful circuit for monitoring the condition of a telephone line used for ordinary telephony. The circuit detects malfunctions such as severance and shorting which result in the termination of line potential. The invention does not require a floating (ungrounded) DC power supply and the output is referenced to earth-ground.

5 Claims, 1 Drawing Figure

CIRCUIT FOR DETECTING LOSS OF TELEPHONE LINE VOLTAGE

FIELD OF THE INVENTION

This invention relates to electronic devices that automatically monitor the operational status of a telephone line.

DESCRIPTION OF THE PRIOR ART

The reporting of emergency events such as burglary and intrusion has generally been carried out by alarm sending apparatus such as the popular automatic-telephone-dialer. However, such apparatus are vulnerable, just as the subscriber's telephone handset is also vulnerable, to telephone line malfunctions such as a short, or line severance, causing them to become totally inoperative.

In telephone systems at present, there is no way, other than going off-hook and finding no response, whereby a subscriber will be apprised of a nonfunctioning system. Cutting the telephone line (wire) on the outside of a home or building, if there is feared to be someone present or some sort of telephone-connected police alarm, is standard procedure amongst those seasoned in the ways of crime commission.

In recent years, numerous electronic devices mostly associated with burglar/intrusion alarm systems have been devised for assuring the ready condition of service by alerting upon occurrence of abnormal line conditions that render the telephone system inoperative. These prior art devices differ from my invention in ways that are important, as described hereinafter.

Two patented prior art devices are known to me; they are the patent to F. C. Butterbaugh, titled: "AUTOMATIC TELEPHONE ALARM SYSTEM," U.S. Pat. No. 3,573,780, issued Apr. 6, 1971, and the patent to E. C. Altenberger, issued Oct. 23, 1973 and titled: "BURGLAR ALARM ACTUATED BY CUT TELEPHONE WIRE," U.S. Pat. No. 3,767,867. These two patents typify the prior art as they exemplify separate positive and negative telephone line connector leads, a floating/off-ground power supply, and an electrical output signal which is not referenceable to earth-ground.

SUMMARY OF INVENTION

A high impedance device bridging the wires of a telephone line for automatically monitoring the line's operational condition. The device comprises an all solid-state circuit detectable of sufficiently reduced or terminated telephone line voltage, which upon detection thereof registers an electrical output change indicating such, said device having contacts connectable to the negative (Ring) and positive (Tip) polarity telephone wires, said contacts being nonpolar, i.e., independent of telephone wire polarity, the device being powered from an earth-grounded DC supply, and the device providing an electrical output signal that is referenced to earth-ground.

An object of the invention is to realize a device in which registering the presence of a typically normal telephone line voltage requires a substantially negligible amount of current from the line.

DESCRIPTION OF THE PREFERRED EMBODIMENT

Figure 1:
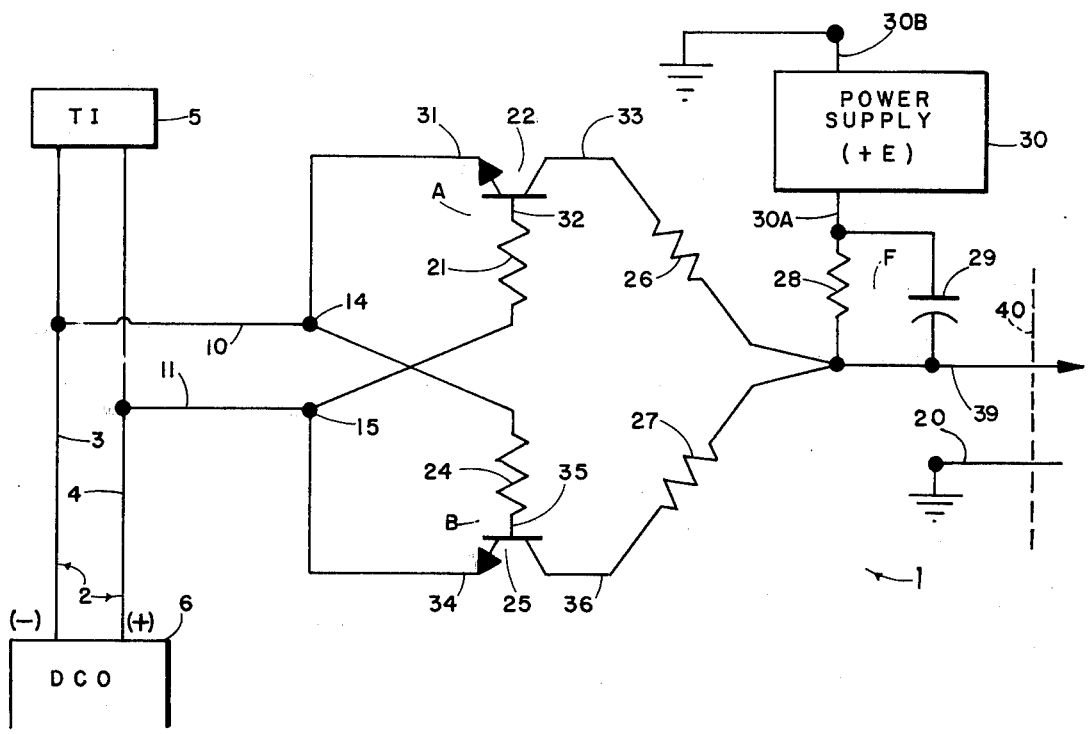
FIG. 1 illustrates a preferred embodiment circuitry of the present invention.

The circuit device of this invention is generally shown at 1, and is designed to interface with a conventional telephone service line 2 having two wires 3 and 4. The line 2 is connected at its subscriber end to a telephone or telephone instrument 5, and its other end by a dial-central-office (DCO) exchange 6. The two wires 3 and 4 of the telephone line are commonly known as Ring 3 and Tip 4.

Two operational states characterize the telephone system: on-hook and off-hook. On-hook is the state in which the telephone 5 is disconnected from the telephone line 2; off-hook is the state in which the telephone 5 is electrically connected to the telephone line 2. The normal on-hook Ring 3 DC voltage with respect to ground is −48 volts (positive grounded DCO battery), i.e., the DCO battery voltage; when on-hook, the Tip 4 is at ground potential. The off-hook Ring 3 to ground voltage is typically −27 VDC with the Tip 4 to ground voltage typically at −21 VDC; this corresponds to an off-hook instrument bias voltage of near 6 VDC. Should the DCO 6 have line-polarity-reversing upon connection with an addressed party, the above-mentioned off-hook telephone line wire voltages with respect to ground are interchanged thereupon.

Throughout this specification, the word "ground" denotes earth-ground.

FIG. 1 shows a schematic diagram of this invention. Contacts 10 and 11 interchangeably bridge the device 1 to a telephone line 2. The device 1 has an output 39 which manifests the status of the line's potential. As will be explained, a high output 39 (+E volts) represents a loss of telephone line potential, i.e., an alarm condition, while a low output 39 (less than +E volts) corresponds to the normal condition of line potential.

In FIG. 1, a dotted line 40 represents a division, the left side of the line 40 representing the circuit device 1 of this invention and the right side of the line 40 representing the location of attached devices, not shown and as hereinafter described, the latter being grounded at 20.

The output 39 signal is referenced to ground as the negative terminal 30B of the power supply 30 is grounded. Consequently, the output 39 return-current occurs via earth-ground 20. The above is a desirable feature as output 39 is, therefore, directly compatible with complex electronic equipment the input/output (s) of which are generally referenced to ground. Moreover, the present invention is easily integrated into electronic systems as they are generally powered by DC supplys which are earth-grounded.

As shown in the preferred embodiment, input contacts 10 and 11 are connected to two simple transistor circuits at nodes 14 and 15, respectively. Each circuit consists of a resistor 21,24 and a bipolar transistor 22,25 in a common-emitter configuration and realizes a line potential detector. The resistor 21 and the transistor 22 comprise one detector A while the resistor 24 and the transistor 25 comprise the other detector B. Regarding the first mentioned detector A, the base lead 32 is connected to one terminal of the resistor 21; the emitter lead 31 is connected to the node 14 and the other terminal of the resistor 21 is connected to the node 15. For the other detector B, the base lead 35 is connected to one terminal of the resistor 24; the emitter lead 34 is connected to the node 15 and the other terminal of the resistor 24 is connected to the node 14.

The serial connections of resistor 21,24 and the base-emitter junction of its associated transistor 22,25 have the input characteristics of each detector to be unilateral. For example, when the line contact 11 is positive with respect to the line contact 10 (normal input polarity), transistor 22,25 is on,off while a reverse line polarity has transistor 22,25 off,on. In general, "on" merely means in a forward conduction mode; but in the circuits at hand (A & B), it particularly refers to a "saturated" condition. In the interest of clarity, the base-emitter junction of transistor 22,25 comprises that internal semiconductor region (P-N junction) linking base lead 32,35 and emitter lead 31,34.

The above described bilateral, i.e. complementary, arrangement of detectors A and B always has one transistor 22 or 25 biased on except when the line potential becomes substantially reduced or terminated — typically substantially zero — thereby cutting-off both transistors, e.g., cut or shorted telephone line 2. Thus, in accordance with the heretofore mentioned line-polarity-reversing, no false alarms occur if the polarity of the line's potential is reversed.

The collector outputs 33 and 36 of both detectors A and B are connected to a three-terminal resistive wye (or T) circuit comprised of the resistors 26, 27 and 28. The collector lead 33 is connected to the resistor 26 and the collector lead 36 is connected to the resistor 27.

The earth-grounded power source means 30 (+E) serves as a source of DC voltage for the circuit (device) 1 and is connected to the latter resistor 28 by the wire 30A.

It is within the scope of this invention for bias supply (power supply) means 30 to be realized by batteries as well as conventional electrical/electronic means. Furthermore, the only definite requirement imposed upon the power supply means 30 is that it be substantially more positive than the negative telephone line potential at all times; thus, power supply means 30 could be simply realized by a ground connection itself, i.e., 0 volts, should such be considered particularly advantageous.

When either of the transistors 22 or 25 is on, current flows from the power source means 30 through the resistor 28, thus lowering the output 39 voltage. Otherwise, i.e., both transistors cut-off, no current flows through the resistor 28 and the output 39 open-circuit voltage is +E which corresponds to an alarm condition. Only a meager current flows through the resistor 28, thus making the device's power consumption very low.

The three resistors 26, 27 and 28 are typically of substantially equal value. With the power supply means 30 at +5 VDC, the normal (no-alarm) open-circuit output 39 voltage is then near −10 volts. The base resistors 21 and 24 are typically of substantially greater resistance than the resistors 26, 27 and 28, unless the circuit is designed with low beta (current gain) transistors. Therefore, the resistors 26, 27 and 28 must be relatively large as, in general, they determine the extent to which the device 1 loads the telephone line.

Next in the circuit there is connected in parallel with the resistor 28 a capacitor 29. The latter resistor 28 and the capacitor 29 realizes a low-pass filter F which precludes false alarms by the usual transcients on the line, e.g., the nominal 20 cycle/second ring-voltage.

Because of this device's high impedance nature, the output 39 is generally coupled through a buffer stage (common-collector transistor, voltage follower) before being utilized, e.g., to actuate an audible alarm such as a siren, the buffer stage not being shown.

It is noted that the above specification, excepting polarity differences, applies equally when the line terminating DCO 6 has a negative grounded battery.

For purposes of illustration, the following type/values of components in the drawing may be regarded as practical: the transistors are 2N5210, the resistors 21 and 24 are 2.2 MEG, the resistors 26 and 27 are 330K, the resistor 28 is 220K and the capacitor is 1 microfarad.

It can, therefore, be seen that this invention provides a new and useful device for use with operational telephone lines whose cost of fabrication is quite low. Many modifications and variations of the present invention are possible in view of the preceding disclosure. Accordingly, within the scope of the appended claims, the invention may be practiced otherwise than as specifically described.

I claim:

1. A telephone line voltage loss detection device for signalling attenuation of the potential between the wires of a telephone line, said device comprising in combination:
  a. a nonpolar pair of mutually insulated contacts for bridging said device to said telephone line,
  b. said device comprising dual line potential detectors, each of said detectors comprising a bipolar transistor and a resistor, and
    being arranged to have the input of each said detector comprise the unilateral combination of its said resistor in serial connection with the base-emitter junction of its said transistor, and
    said inputs being bilaterally connected across said contact pair, the polarity received by said contacts biasing one of said transistors on, the reversing of said polarity biasing said other transistor on; substantial attenuation of said potential therebetween cuts-off both of said transistors of which one is otherwise on,
  c. circuit means connected to the collector outputs of said detectors, grounded power power supply means connected to said circuit means, said circuit means delivering an output signal which manifests the status of said line potential, and
    filter means responsive to the usual transients on said telephone line delivered through said detector resistors for reducing the effects of said transients,
    said output signal being referenced to earthground and electrically connectable to a suitable means for utilization.

2. The detection device of claim 1 in further combination with a telephone line as described having a pair of telephone wires bridged by said contacts as described, and a telephone receiver-transmitter instrument connected to said wires at one end of said line and a dial-central-office exchange connected to said wires at the other end of said line.

3. The detection device of claim 1 in which said resistor of each said detector is connected to the base lead of its said transistor.

4. The detection device of claim 1 in which said circuit means comprises a three-terminal resistive wye circuit.

5. The detection device of claim 4 in which said filter means comprises a capacitor connected between the output of said resistive wye circuit and said earthground.

* * * * *